United States Patent [19]

Asada

[11] Patent Number: 4,905,809

[45] Date of Patent: Mar. 6, 1990

[54] CLUTCH COVER ASSEMBLY

[75] Inventor: Masaaki Asada, Ibaraki, Japan

[73] Assignee: Kabushiki Kaisha Daikin Seisakusho, Osaka, Japan

[21] Appl. No.: 243,010

[22] PCT Filed: Dec. 14, 1987

[86] PCT No.: PCT/JP87/00977

§ 371 Date: Aug. 2, 1988

§ 102(e) Date: Aug. 2, 1988

[30] Foreign Application Priority Data

Dec. 29, 1986 [JP] Japan ............................. 61-312756

[51] Int. Cl.$^4$ ..................... F16D 13/49; F16D 13/71
[52] U.S. Cl. ................................. 192/89 B; 192/70.3; 192/99 A
[58] Field of Search ................. 192/70.3, 70.29, 89 B, 192/99 A, 70.22

[56] References Cited

U.S. PATENT DOCUMENTS

| | | | |
|---|---|---|---|
| 2,727,612 | 12/1955 | Thelander | 192/99 A |
| 2,751,055 | 6/1956 | Dodge et al. | 192/89 B X |
| 4,332,314 | 6/1982 | Flotow | 192/89 B |
| 4,601,377 | 7/1986 | Flotow et al. | 192/70.3 X |
| 4,720,002 | 1/1988 | Kitano et al. | 192/70.3 X |

FOREIGN PATENT DOCUMENTS

| | | |
|---|---|---|
| 22208 | 6/1976 | Japan . |
| 35624 | 8/1978 | Japan . |
| 57-79331 | 5/1982 | Japan . |
| 1339000 | 11/1973 | United Kingdom ............. 192/89 B |

Primary Examiner—Rodney H. Bonck
Attorney, Agent, or Firm—Armstrong, Nikaido, Marmelstein, Kubovcik & Murray

[57] ABSTRACT

A clutch cover assembly, in which a radially inner side spring force action point (an inside projection 44, for example) of a lever 40 is provided at a position radially outer than wire rings 34 supporting a diaphragm spring 30, a radially outer side spring force action point (an outside projection 46) of the lever 40 is provided at a position to cause a distance B between a rotation center 01 of the lever 40 and the outer side spring force action point to be shorter than a distance A between the rotation center 01 and the inner side spring force action point, and the lever 40 is adapted to multiply a spring force P of the diaphragm spring 30.

The lever 40 is required only to transmit the spring force of the diaphragm spring 30 to the pressure plate 12 while multiplying it, so that a lever ratio can be set large and an axial length of clutch can be shortened.

4 Claims, 2 Drawing Sheets

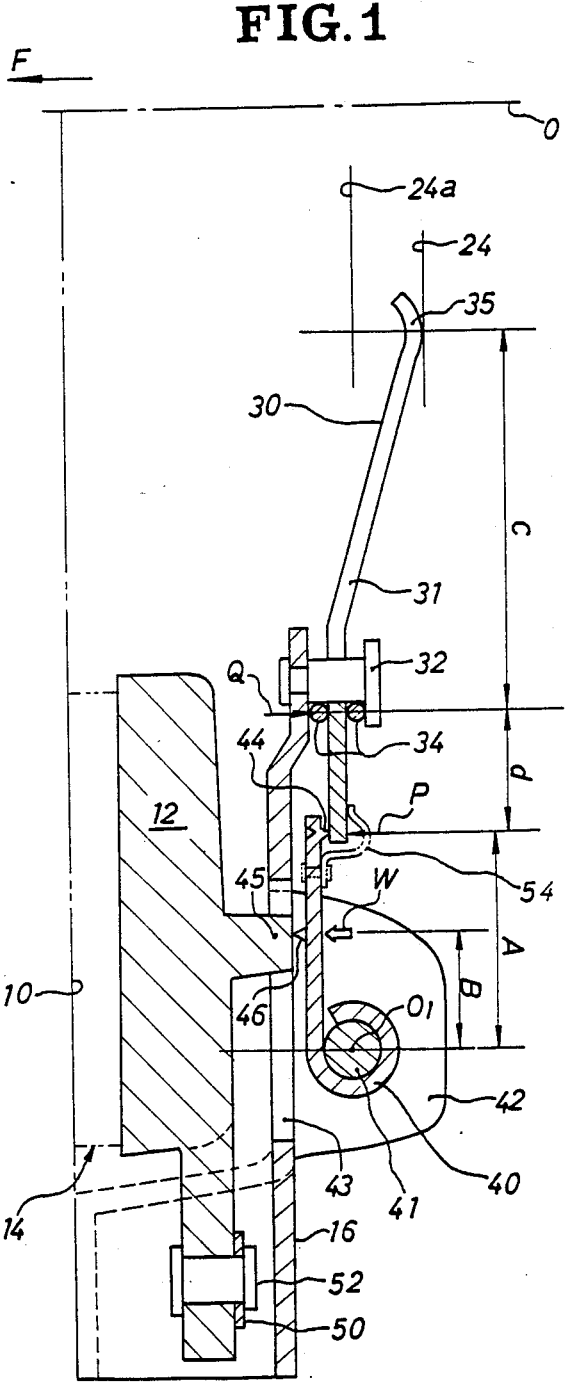
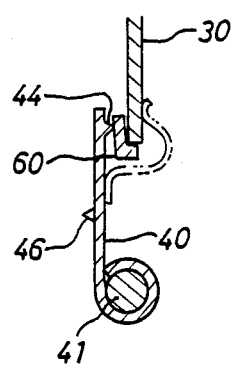
FIG. 1
FIG. 2

CLUTCH COVER ASSEMBLY

DESCRIPTION (1) Industrial Useful Field

This invention relates to a clutch cover assembly, in which a spring member for pressing a pressure plate is disposed at an ouside of a clutch cover.

(2) Background Art

As for this type of clutch, a conventional embodiment as illustrated by FIG. 3 is known (Published Patent Application (KOKAI) No. 57-79331).

In FIG. 3, 10 is a flywheel of an engine. A clutch disc 14 is sandwiched between the flywheel 10 and a pressure plate 12. The pressure plate 12 is covered by a clutch cover 16, mounted on flywheel 10. A spring member 18, formed into an annular disc shape, and release operation lever 20 for transmitting a spring force of the spring member 18 to the pressure plate 12 are disposed at an outside of the clutch cover 16. Levers 20 are disposed at four places, for example, with equal distances left therebetween in a circumferential direction of clutch, and so constructed that an inner peripheral side end of the lever 20 is pressed by a release bearing 24 concentric with an input shaft 22.

However, in the conventional embodiment of FIG. 3 the spring force of the spring member 18 can not be multiplied because a lever ratio of the lever 20 is small.

Further, the axial dimension of the entire clutch becomes larger because the spring member 18 and the lever 20 are disposed in series in an axial direction of the clutch.

DISCLOSURE OF THE INVENTION

An object of this invention is to provide a clutch cover assembly, in which an annular disc-like spring member is disposed at an outside of a clutch cover, characterized by that a lever ratio for multiplying a spring force of the spring member can be set large and an axial dimension of the assembly can be shortened.

Other features and advantages of the invention will become apparent from the description given below, taken in connection with the accompanying drawings.

STRUCTURE OF THE INVENTION (1) Technical measure

This invention provides a clutch cover assembly, in which an approximately annular disc-like spring member is disposed at an outside of a clutch cover covering a pressure plate and the spring member applies a spring force to the pressure plate; characterized by that the spring member is composed of a diaphragm spring exerting a spring force toward the pressure plate; the clutch cover supports the diaphragm spring and forms a fulcrum for stopping reaction spring force of the diaphragm spring; a lever for multiplying the spring force is carried by the clutch cover around a rotation center located at a position radially outer of a spring force transmitting part of the pressure plate, and is disposed in a radial direction; a radially inner side spring force action point of the lever is provided at a position radially outer of said fulcrum of the diaphragm spring; a radially outer side spring force action point of the lever, which compressively contacts with said spring force transmitting part, is provided at a position to cause a distance between the rotation center of the lever and the outer side spring force action point to be shorter than a distance between said rotation center and the inner side spring force action point; and the lever multiplies the spring force of the diaphragm spring.

(2) Function

The only requirement of the lever is to transmit the spring force of the diaphragm spring to the pressure plate while multiplying the force. Thus, it is possible to set the lever ratio large and to shorten the axial dimension of the clutch.

BRIEF DESCRIPTION OF THE DRAWINGS

FIG. 1 is a vertical partial sectional view of a clutch of a first embodiment according to the invention.

FIG. 2 is a vertical partial sectional view of a second embodiment.

Figure 3:
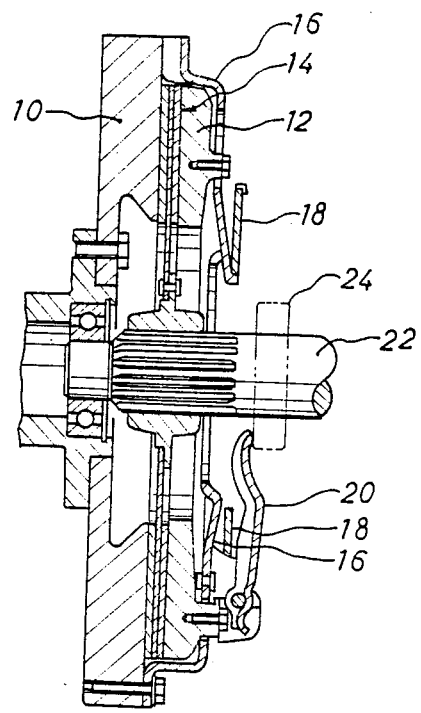
FIG. 3 is a vertical sectional view of a conventional spring and lever arrangement.

BEST MODE FOR CARRYING OUT THE INVENTION (1) First embodiment

In FIG. 1 which is a vertical partial sectional view of a clutch for large automobile according to the present invention, components attached with the same symbols as FIG. 3 represent the same or corresponding components.

In FIG. 1, an approximately annular pressure plate 12 whch is concentric over the entire circumference around a center line O, is covered by a press-formed clutch cover 16. The outer peripheral part of clutch cover 16 is connected to a flywheel 10. The clutch cover 16 is also formed into an approximately annular shape concentric over the entire circumference.

A diaphragm spring 30 is disposed at a rear side (an arrow F indicating a front side) of the flywheel 10, and a stud pin 32 is fitted in a notch 31 of diaphram spring 30 extending radially from an inner peripheral part of the diaphragm spring 30 to lock rotative movement of diaphragm spring 30. The stud pin 32 is secured to an inner peripheral part of the clutch cover 16. Two wire rings 34 are interposed between the stud pin 32 and the diaphragm spring 30, so that the clutch cover 16 absorbs the reaction force Q of the diaphragm spring 30 through the wire rings 34.

An inner peripheral part 35 of the diaphragm spring 30 compressively contacts release bearing 24 (FIG. 3). The spring force P of the diaphragm spring 30 is by pulling the inner peripheral part 35 forward to a position indicated by symbol 24a and is a well-known structure.

Cantilever type levers 40 are disposed at four places, for example, in the circumferential direction of the clutch cover 16, with equal distances left therebetween. Each lever 40 is carried by a shaft 41 in a freely rotatable manner. The shaft 41, extending in a direction normal to a plane of FIG. 1, is supported by lips 42 at the opposite ends of shaft 41. Lips 42 are formed by cutting and raising upright parts of the clutch cover 16, leaving hole 43 in the clutch cover 16. A fulcrum land 45 integral with the prssure plate 12 projects through the hole 43 toward an outside of the clutch cover 16.

An inside projection 44 is formed on a radially inner peripheral part of the diaphragm spring 30, i.e. an upper part thereof in FIG. 1. The inside projection 44 contacts, compressively, with the diaphragm spring 30. An outside projection 46 is formed at an intermediate part of the lever 40. The outside projection 46 contacts, compressively, with the fulcrum land 45 of the pressure plate 12.

A distance A between a center O1 of the shaft 41 and the inside projection 44 is larger than a distance B between the center O1 and the outside projection 46, so that a lever ratio of the lever 40 is made large. Accordingly, a spring force P of the diaphragm spring 30 acting on the inside projection 44 is multiplied by a lever ratio A:B to be transmitted from the outside projection 46 to the fulcrum land 45 as a spring force W.

Therefore, the wire ring 34 is separated from the inside projection 44 by a distance d, and an effective radius of the diaphragm spring 30 becomes c.

One end of a strap spring plate 50 extending in the circumferential direction of the clutch, i.e. normal to the plane, is fastened by a rivet 52 to an outer peripheral part of the pressure plate 12, and the other end of the strap spring plate 50 (not shown) is fastened to the clutch cover 16. Consequently, under a released state, where the spring force W from the inside projection 44 is removed, the pressure plate 12 is pulled back by a spring force of the strap spring plate 50.

When the pressure plate 12 is not pulled backward, that is: the clutch is not disengaged, by the spring force of the strap spring plate 50, the lever 40 may be connected to he diaphragm spring 30 by a clip 54 so that the lever 40 may be forcedly pulled backward.

Function will be described hereinunder. Under a clutch engaged state, as illustrated by FIG. 1, the reaction force Q of the diaphragm spring 30 is stopped by the clutch cover 16 and the spring force P acts on the inside projection 44 of the lever 40. The spring force P is multiplied up to the spring force W by the lever ratio A:B of the lever 40 transmitted to the fulcrum land 45 of the pressure plate 12.

At the time of clutch released state, when the release bearing 24 is moved to the position 24a, the inner peripheral part 35 of the diaphragm spring 30 is pushed forward to prevent the spring force P of the diaphragm spring 30 from being produced, so that the diaphragm spring 30 leaves the inside projection 44. In this state, the spring force W transmitted to the fulcrum land 45 is removed and a pressing force of the pressure plate 12, pushing the cluch disc 14 toward the flywheel 10, does not function. The pressure plate 12 is pulled back by the spring force of strap spring plate 50. Therefore, the clutch engaged state, where the clutch disc 14 is sandwiched between the flywheel 10 and the pressure plate 12, is released.

Because the diaphragm spring 30 is disposed at the outside of the clutch cover 16, the diaphragm spring 30 is cooled by an outside air of comparatively low temperature and thermal infuence is avoided.

The lever 40 is not swung directly by the release bearing 24, as in the conventional embodiment, but is only required to transmit the spring force of the diaphragm spring 30 to the fulcrum land 45. Thus the lever ratio A:B can be set large. Accordingly, a large spring force W can be produced from a small spring force P. Further, the releasing load of the release bearing 24, i.e. a depressing force of a clutch pedal is also small.

Because the axial thickness of the lever 40 is small, the axial dimension of the entire clutch becomes small. A compact design of clutch is accomplished.

(2) Second embodiment

In FIG. 2 showing a second embodiment of the automobile clutch according to the present invention, an approximately annular bracket 60, concentric over the entire circumference, is interposed between an outer peripheral edge 33 of the diaphragm spring 30 and the inside projection 44. Bracket 60 can transmit the load of the diaphragm spring 30 over the entire width of the lever 40.

EFFECT OF THE INVENTION

As described above, in the clutch cover assembly according to the present invention; the spring member is composed of the diaphragm spring 30 exerting its spring force P toward the pressure plate; the clutch cover supports the diaphragm spring 30 to form the fulcrum (the wire ring 34, for example) for stopping the reaction spring force Q of the diaphragm spring 30; the lever 40 for multiplying the spring force carried by the clutch cover 16 around the rotation center located at the position radially outer than the spring force transmitting part (the fulcrum land 45, for example) of the pressure plate 12, is disposed in the radial direction; the radially inner side spring force action point (the inside projection 44, for example) of the lever 40 is provided at a position radially outer than the wire ring 34 supporting said diaphragm spring 30; the radially outer side spring force action point (the outside projection 46) of the lever 40 is provided at the position to cause the distance B between the rotation center 01 of the lever 40 and the outer side spring force action point to be shorter than the distance A between said rotation center 01 and the inner side spring force action point 44; and the lever 40 multiplies the spring force P of the diaphragm spring 30. Accordingly, the following effects become obtainable.

Because the diaphragm spring 30 is disposed at the outside of the clutch cover 16, the diaphragm spring 30 is cooled by the outside air of comparatively low temperature and does not undergo thermal influence. Thus, service life of the diaphragm spring is prolonged.

The lever 40 is not swung directly by the release bearing 24, as in the conventional embodiment, but is required only to transmit the spring force of the diaphragm spring 30 to the fulcrum land 45 so that the lever ratio A:B can be large. Accordingly, large spring force W can be produced from small spring force P. Further, the releasing load of the release bearing 24, i.e. the depressing force of the clutch pedal can be minimized.

Because the axial thickness of the lever 40 becomes small and the diaphragm spring 30 is supported by the clutch cover 16, the axial dimension of the entire clutch can be reduced. Compact design of the clutch is attained.

What is claimed is:

1. A clutch cover assembly for a clutch having, in axial alignment, a pressure plate, a clutch cover covering said pressure plate and an approximately annular disc-like spring member disposed outside of said clutch cover for applying resilient clutch engaging pressure to said pressure plate; characterized by that said disc-like spring is a diaphragm spring supported, intermediate its inner periphery and its outer periphery, for pivotal, resilient, axial movement on spring fulcrums extending axially from said clutch cover, levers in radial alignment with each of said spring fulcrums, each of said levers having a radial inner end portion between said clutch cover and the outer periphery of said diaphragm spring and a radial outer portion pivotally mounted on said clutch cover about an axis normal to the axis of said clutch cover and said pressure plate, each of said levers having an inside projection at it inner end portion in contact with said diaphragm spring adjacent said outer periphery of said diaphragm spring and an outside projection, intermediate said pivotally mounted outer portion and said inner projection, in engagement with said pressure plate for transmitting the spring force applied by said diaphragm spring from said inner end portion of said lever through said outside projection to said pressure plate.

2. A clutch cover assembly, as recited in claim 1, in which said pressure plate includes a fulcrum land at each of said levers projecting through an opening in said cover and in contact with said outside projection on said each of said levers for transmitting said spring force applied by said diaphragm spring to said inner portion of said lever to said pressure plate.

3. A clutch cover assembly, as recited in claim 1, in which said spring fulcrums extending axially from said clutch cover are stud pins fitted in the inner peripheral portion of said clutch cover and spaced equidistantly radially and circumferentially around said inner peripheral portion of said clutch cover, each of said stud pins, respectfully, being fitted into a notch in said diaphragm spring extending radially outward from the inner periphery of said diaphragm spring and wire rings are disposed on said stud pins on the opposite sides of said diaphragm spring.

4. A clutch cover assembly, as recited in claim 1, in which an annular ring, is disposed between an outer peripheral edge of said diaphragm spring and said inner peripheral side portion of said levers, said inner projection on the inner peripheral side portion of said levers contacting said annular ring.

* * * * *